United States Patent [19]
Guienne et al.

[11] 3,863,589
[45] Feb. 4, 1975

[54] FENDER SYSTEM
[75] Inventors: Paul Francois Guienne, Paris; Jacques Francois Robert Prouhet, Les Clayes-sous-Bois, both of France
[73] Assignee: Bertin & Cie, Plaisir, France
[22] Filed: June 11, 1973
[21] Appl. No.: 368,742

[30] Foreign Application Priority Data
June 14, 1972 France .............................. 72.21372

[52] U.S. Cl. .............. 114/219, 293/71 P, 293/71 R
[51] Int. Cl. ............................................ B63b 21/04
[58] Field of Search ....... 114/219, 220; 293/1, 71 P, 293/71 R; 213/22

[56] References Cited
UNITED STATES PATENTS

| | | | |
|---|---|---|---|
| 2,105,815 | 1/1938 | Mass | 114/219 |
| 2,562,957 | 8/1951 | Sipkin | 114/219 |
| 3,130,998 | 4/1964 | Andersen | 293/71 R |
| 3,610,609 | 10/1971 | Sobel | 114/219 |
| 3,661,359 | 5/1972 | Walker | 293/71 P |
| 3,664,653 | 5/1972 | Walker | 114/219 |
| 3,721,433 | 3/1973 | Sobel | 293/71 R |
| 3,741,598 | 6/1973 | Novak | 293/71 P |

FOREIGN PATENTS OR APPLICATIONS

| | | | |
|---|---|---|---|
| 863,300 | 3/1941 | France | 114/219 |
| 495,143 | 6/1954 | Italy | 114/219 |

Primary Examiner—Robert J. Spar
Assistant Examiner—Gary Auton
Attorney, Agent, or Firm—A. W. Breiner

[57] ABSTRACT

The hull of a ship is maintained at a distance from a quay or the hull of another ship by means of a fender having a deformable chamber whose wall is composed of flexible toric elements. The edges of the latter are tightened between ported flanges having the general shape of the rim of a car wheel and bearing stops for limiting the crushing of the chamber. Alternatively, the crushing limiter stop is a cylindrical sleeve of compressible resilient material fitted to a bottom of the chamber and projecting therein towards the opposite bottom, so as to constitute by itself a permanent backing auxiliary fender.

9 Claims, 10 Drawing Figures

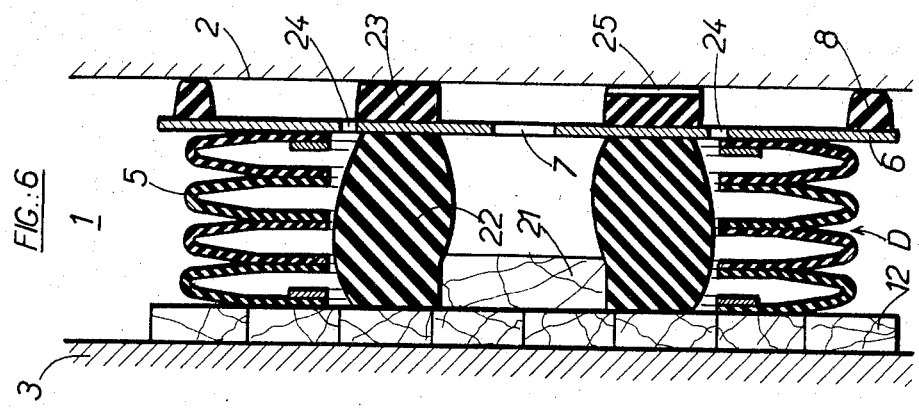
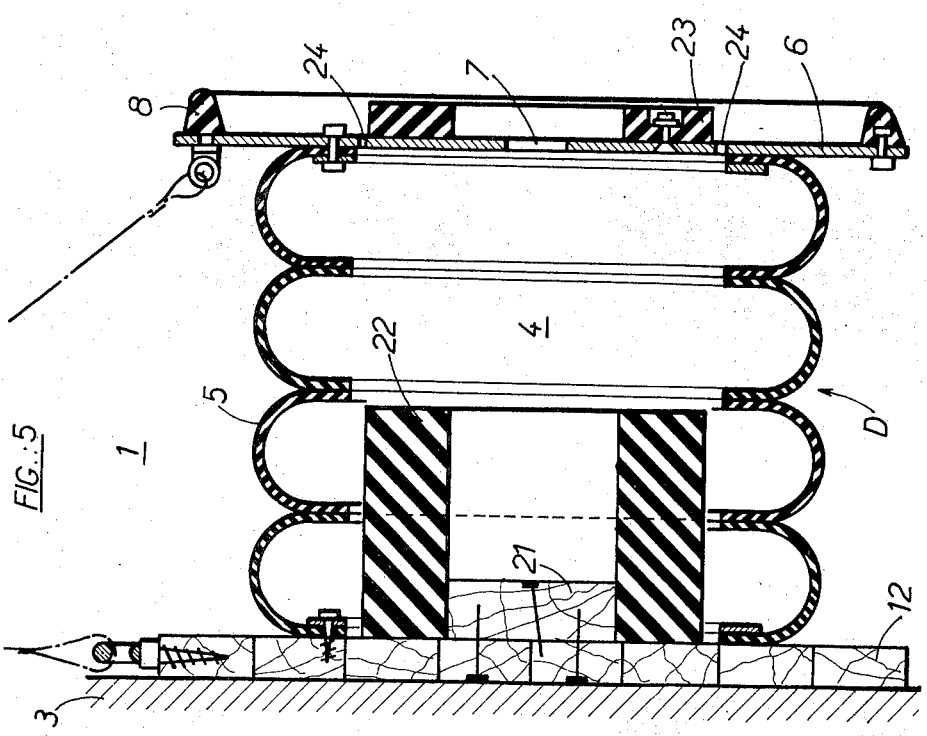

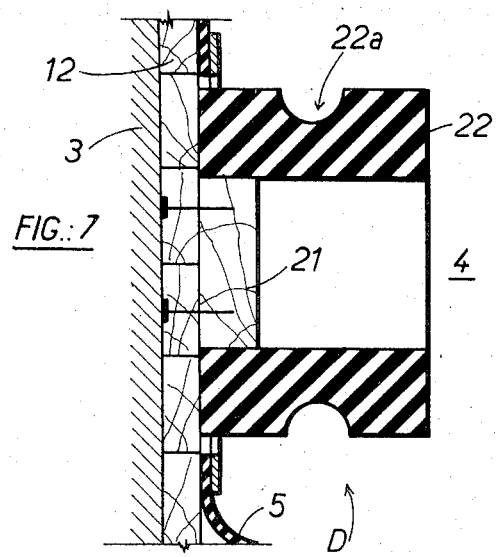
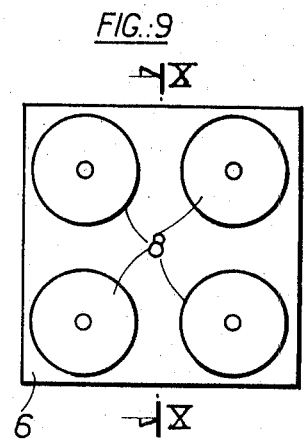
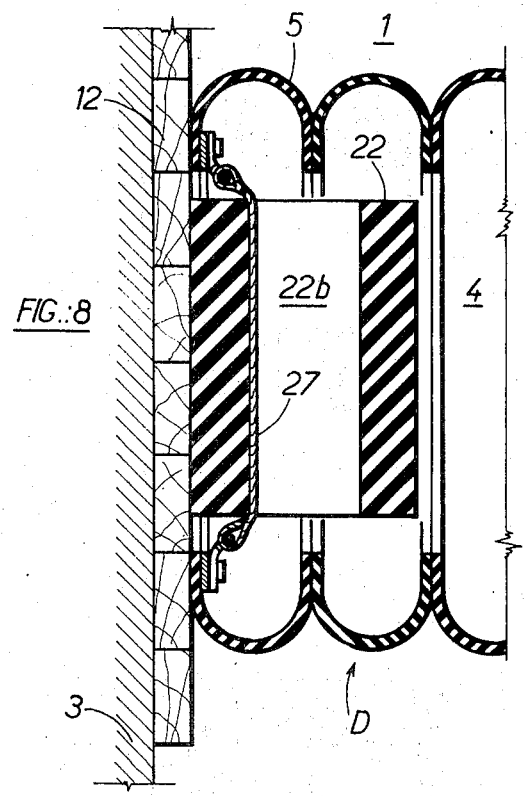
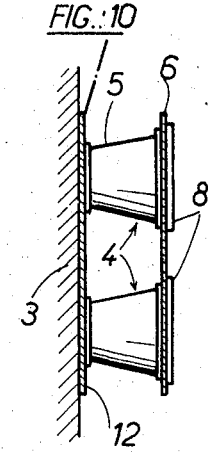

FENDER SYSTEM

Our copending patent application Ser. No. 220,799, now U.S. Pat. No. 3,773,008 filed Jan. 26, 1972 describes a fender device designed to be interposed between the hull of a ship and a quay or the hull of another ship in order to generate a horizontal repelling force which antagonizes proximity translation, this device being submerged and developing a pressurized water cushion which allows frictionless relation displacement in a vertical plane perpendicular to said translation. The subject submerged device comprises a deformable chamber containing the cushion water whose pressurization takes place by crushing of the said chamber under the action of the ship's hull during its proximity translation. The above deformable chamber may be bounded by a succession of jointed flexible bodies giving it a wavy outline and adapted to generate a resilient return force enabling it to recover its initial shape after crushing.

In the embodiments described in the abovementioned application, the deformable chamber ends with a bottom constituted by a plate pierced with one or more ports and presenting an outwardly projecting peripheral lip.

The present invention relates to another embodiment of such a fender device and applies more specifically to a deformable chamber which is composed of one or more toric elements and whose crushing is limited by a stop or several stops preferably of compressible resilient material.

This invention has more particularly for its object to provide an embodiment with a stop limiting the crushing of the deformable chamber and capable of constituting a permanent backing auxiliary fender. This chamber may have any convenient shape, for instance : cylindrical of planshape circular cross-section, conical or toric with one or more tori.

In the accompanying drawings:

FIG. 5 is a longitudinal section of an alternative embodiment shown in its extension position.

FIG. 6 is a similar view of the device in its compressed position for which the limiting stop constitutes an auxiliary fender.

FIGS. 7 and 8 illustrate, in fragmentary longitudinal section, two other alternative embodiments of the crushing limiter stop.

FIG. 9 is a front view of a fender device comprising several deformable chambers.

FIG. 10 is a section taken along line X—X of FIG. 9.

Figure 1:
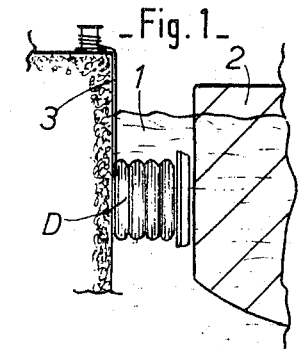
FIG. 1 is a diagrammatic side elevation view of a fender device according to the invention, shown in position.
Figure 2:
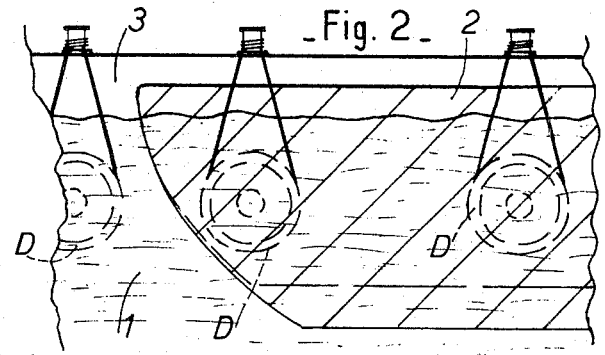
FIG. 2 is a corresponding front elevation diagrammatic view.

On FIGS. 1 and 2, the body of water is shown at 1, the hull of a ship at 2 and the quay (or possibly the hull of another ship) at 3, fender devices D being interposed as usual between 2 and 3 and being fitted to either or else suspended therebetween, thus allowing adjusting the altitude of the fender.

Figure 3:
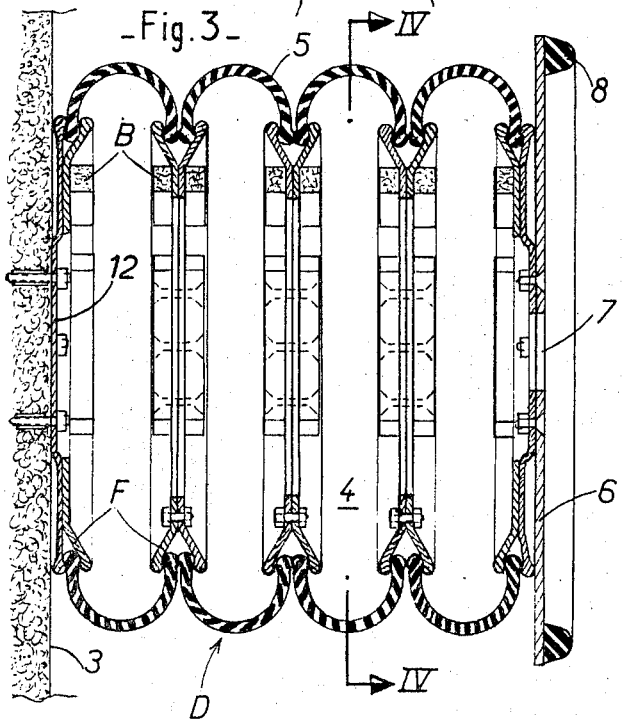
FIG. 3 is a longitudinal section of an embodiment of the present invention, taken along line III—III of FIG. 4.
Figure 4:
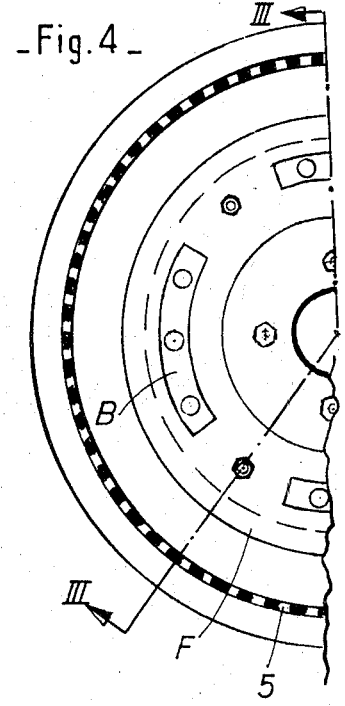
FIG. 4 is a cross-section thereof, taken along line IV—IV of FIG. 3.

As better seen on FIGS. 3 and 4, each fender device comprises a chamber 4 bounded by a side wall 5 constituted by one or more tori of unstretchable flexible material, such as an aircraft tyre, of circular arc-shaped section and having conveniently a reinforcement of strong canvas coated with rubber specially selected for its resistance to sea water and salted air. This chamber 4 is further provided with a bottom constituted by a plate 6 pierced with one or more holes 7 and presenting an outwardly protruding peripheral lip 8. Opposite to plate 6, wall 5 is watertightly fixed to a backing plate 12.

These various components of the fender device are akin to those of the above-mentioned application and have the same reference numerals. Operation being the same, it appears unnecessary to duplicate the description.

The present invention relates to an internal mechanical arrangement of the fender device, composed basically of :

annular flanges F having the general shape of the rim of a car wheel and squeezing the edges of the tori of wall 5, the end flanges being respectively fixed to quay 3 and plate 6, stops B of compressible resilient material, fitted on these flanges F in order to limit the crushing of chamber 4, these stops B cooperating with the tori which may themselves comprise a sufficient thickness of rubber to offer a resilient resistance to crushing and form a backing rest when the ship is stationary, being tied to the quay by moorings.

An advantage of this device is that it allows construction with thick walls, in the range of 0.2 to 0.6 inches, able to withstand animal, chemical or mechanical aggressions while retaining flexibility which renders them capable of great crushing without breaking, and whose resilience is sufficient for returning the fender to its initial expanded state when the ship no longer exerts a pressing force towards the quay, without requiring any spring or other return means.

The toric shape and the thickness of the walls also impart to the assembly resistance to shear parallel to the quay; it is therefore not necessary to provide for means such as floats in order to support the free end of the fender.

This device also affords safety in case of failure of the cushion.

In the alternative embodiment of FIGS. 5 and 6, the backing plate 12 comprises an extension 21 designed to support a cylindrical sleeve 22 whose outer diameter is about twice its inner diameter and which is designed so as to leave a slight peripheral clearance between sleeve 22 and wall 5. The length of sleeve 22 is substantially equal to the two-thirds of its outer diameter and to the half of the axial span of chamber 4.

This sleeve is made of a compressible resilient material adapted to withstand aggressions of the sea environment.

The outer face of plate 6 is fitted with a ring 23 preferably of same material as sleeve 22 and of same diameters as the latter but whose thickness is determined so that its outer face be slightly sunk or set back with respect to the tip of the peripheral lip 8. Sleeve 22 and ring 23 are coaxial.

This device operates as follows :

Upon nearing quay 3, the ship's hull 2 crushes chamber 4, thus ejecting the water contained therein, through central orifice 7 and also through one or more ports 24 formed through plate 6. The water thus driven out forms a cushion between the ship's hull 2 and plate 6.

When plate 6 meets sleeve 22 (FIG. 6) due to either the inertia of the ship or the action of the moorings, it deforms thanks to its own resilience and/or the peripheral seal 8 crushes to allow the ship's hull 2 to engage ring 23. The sleeve 22-ring 23 assembly thus forms a permanent backing fender.

The ejection of the water contained in chamber 4 taking place through the central orifice 7, it is convenient to provide for additional ports 24 leading outside ring 23 and/or passages 25 formed in said ring in order to allow discharge of the water despite the almost watertight engagement of sleeve 22 and plate 6 with ring 23 and the ship's hull 2.

A peripheral groove as shown at 22a on FIG. 7 may be formed on sleeve 22 for the purpose of facilitating its deformation when it is requested to constitute a permanent backing fender.

Along the same idea, sleeve 22 may be arranged so that its axis be transverse to that of chamber 4 as shown in FIG. 8, rather than in coincidence therewith or parallel thereto. The sleeve is then fastened to backing plate 12 by means of a cable 27. Sleeve 22 will deform by crushing of its central recess 22b.

FIGS. 9 and 10 illustrate an embodiment of fender device comprising several deformable chambers: four in the example. The walls 5 which bound these chambers are fixed to a backing plate 12 and also to a plate 6 common to the chambers 4 of a same device.

The device illustrated on FIGS. 9 and 10 facilitates the positioning of plate 6 relative to the ship's hull when the latter is imparted with a rolling movement or takes a list, since the chambers of a fender device can crush independently of each other.

The invention obviously applies too to fender devices deprived of movable plate 6, as is the case for instance of that described with reference to FIG. 3 of the above-mentioned application.

We claim:

1. In a fender device having a backing plate and a flexible wall fitted at one end thereof to said backing plate and projecting therefrom to another end to bound a deformable hollow chamber bottomed by said backing plate and collapsible by crushing of said wall towards said backing plate, the improvement comprising a resilient deformable generally cylindrical sleeve housed within said hollow chamber in spaced relationship with said wall thereof with a peripheral clearance being left between said sleeve and said wall for the entire length and periphery of said wall, said sleeve being fitted to said backing plate and projecting therefrom to end short of said another end of said wall.

2. Device as claimed in claim 1, wherein said generally cylindrical sleeve has an outer diameter about twice its inner diameter and a length substantially equal to two-thirds of said outer diameter and to half the inter-bottom span of said deformable chamber when extended.

3. Device as claimed in claim 1, further comprising a ring fitted outwardly of said chamber on the outer face of said opposite bottom thereof and in alinement and cooperative relation with said generally cylindrical sleeve for engagement therewith upon crushing of said chamber.

4. Device as claimed in claim 3, further comprising a ported plate at said opposite bottom of said deformable chamber to communicate the inside thereof with said bottom outer face, and a peripheral lip fitted to said plate and protruding outwardly of said chamber beyond said ring, whereby said ring is sunk with respect to said lip.

5. Device as claimed in claim 4, wherein said plate comprises separate ports opening respectively inside and outside said ring.

6. Device as claimed in claim 4, wherein said ring has flow passage means formed therethrough.

7. Device as claimed in claim 1, wherein a peripheral groove is formed on said sleeve to facilitate deformation thereof.

8. Device as claimed in claim 1, wherein said generally cylindrical sleeve is fitted in said chamber so that the respective axes thereof are substantially parallel to each other.

9. Device as claimed in claim 1, wherein said generally cylindrical sleeve is fitted in said chamber so that the respective axes thereof are substantially transverse to each other.

* * * * *